UNITED STATES PATENT OFFICE 2,504,129

PROCESS OF MAKING MAGNESIUM AND ZINC PERMANGANATES

Theodore Jaskowiak, La Salle, Ill., assignor to Carus Chemical Company, a corporation of Illinois No Drawing. Application October 12, 1945, Serial No. 622,085

2 Claims. (Cl. 23—58)

This invention relates to a method of forming permanganates of the sub group of group II of the periodic system, and more particularly to the formation of magnesium and zinc permanganates from potassium permanganate.

The prior art is summarized in Wilson et al. Patent 1,544,115. In addition to the methods there suggested for the production of calcium permanganate, a disinfecting solution including aluminum permanganate is described in British Patent 10,015 of 1884, this solution being prepared by the interaction of aluminum sulfate and potassium permanganate, the resulting mixture being said to comprise aluminum permanganate and aluminum sulfate. No attempt was made to obtain an aluminum permanganate of greater purity or concentration.

I have now discovered that by proper control of reacting ingredients and reaction temperatures, potassium permanganate and aluminum sulfate, and a limited amount of water will react according to the following equation:

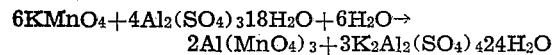

to produce a solution substantially pure and suitable for use in producing the aforementioned permanganates, while nearly all potassium will be removed as crystallized potassium aluminum sulfate. It is to be understood that only sufficient water is added to produce a concentrated solution of aluminum permanganate. Preferably this involves the addition of ingredients in the following proportions:

| | Pounds |
|---|---|
| Potassium permanganate | 172 |
| Aluminum sulfate 18 H2O | 500 |
| Water | 500 |

In this reaction a small excess of aluminum sulfate may be used, depressing further the solubility of potassium salts and not interfering greatly with further use of the resulting solution.

Aluminum permanganate is unstable, especially at higher temperatures and the reaction mixture should preferably be maintained at all times below 80° C. Upon cooling to effect crystallization, the mass is filtered or the potassium aluminum sulfate is removed in any other suitable manner. The resulting aluminum permanganate solution is then employed to produce the desired permanganate such as, for example zinc or magnesium by reaction with the corresponding oxide, hydroxide or carbonate. The required oxide, hydroxide, or carbonate or any admixture and/or sequence thereof, is added in water solution or in any form in suitable proportions to the aluminum permanganate solution, or the aluminum permanganate solution may be added to the oxide etc., or the two may be added to one or the other concurrently. In the case of zinc this reaction is preferably carried out at or near 80° C. Magnesium permanganate may be prepared at higher temperatures. In general, care should be taken to use only such amounts of oxide, etc., as to react completely, without adding an excess, with the aluminum permanganate solution in accordance with the equation:

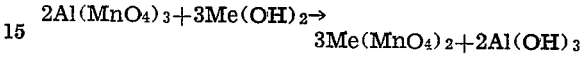

Upon completion of this reaction, the permanganate solution is separated from the precipitated solids as by filtration. The resulting solution is one of substantially the pure permanganate desired, together with small amounts of sulfate and potassium ions. This solution may be used as such or it may further be processed to yield a solution of higher concentration and greater purity or it may be processed to yield a solid crystalline product.

To obtain a solution of greater concentration and higher purity the permanganate solution is concentrated by evaporation, either at atmospheric pressure or under reduced pressure, when sulfates will crystallize out progressively as the concentration rises, these sulfates usually being the lower hydrates. As the concentration increases some potassium permanganate also crystallizes out, especially upon cooling the concentrated solution.

The maximum concentration obtainable varies with different permanganates, depending upon their solubilities.

Permanganates such as zinc and magnesium, though having a rather high solubility in water, will, after concentration, yield well definable crystals which can be separated and kept as such.

The invention described and claimed herein is related to those described and claimed in my copending applications Serial Nos. 622,086 and 622,087, filed October 12, 1945.

The foregoing detailed description has been given for clearness of understanding only, and no unnecessary limitations should be understood therefrom.

What I claim as new, and desire to secure by Letters Patent, is:

1. The method of forming a permanganate which comprises reacting potassium permanganate and aluminum sulfate in the presence of sufficient water to produce a concentrated solution of the aluminum permanganate, said reaction being conducted at a temperature not substantially above 80° C., separating out substantially all the potassium aluminum sulfate, then reacting with the resulting aluminum permanganate in the solution a member of the class consisting of zinc and magnesium oxides, hydroxides, and carbonates at a temperature within the range extending from about 80° C. to the boiling point of the solution, and recovering a permangante of a metal of said group.

2. The method of forming a permanganate which comprises reacting a solution of aluminum permanganate with a member of the class consisting of zinc and magnesium oxides, hydroxides and carbonates at a temperature within the range extending from about 80° C. to the boiling point of the solution, and recovering a permanganate of a metal of said group.

THEODORE JASKOWIAK.

REFERENCES CITED

The following references are of record in the file of this patent:

FOREIGN PATENTS

| Number | Country | Date |
|---|---|---|
| 10,015 | Great Britain | 1884 |

OTHER REFERENCES

Parkes and Mellor: "Mellor's Modern Inorganic Chemistry," Revised Ed., page 118 (1944).